US008072351B1

(12) United States Patent
Absher, II

(10) Patent No.: US 8,072,351 B1
(45) Date of Patent: Dec. 6, 2011

(54) BLIND SPOT ALERT APPARATUS

(76) Inventor: Charlie A. Absher, II, Pounding Mill, VA (US)

(*) Notice: Subject to any disclaimer, the term of this patent is extended or adjusted under 35 U.S.C. 154(b) by 378 days.

(21) Appl. No.: 12/506,941

(22) Filed: Jul. 21, 2009

(51) Int. Cl.
*G08G 1/00* (2006.01)

(52) U.S. Cl. ............ 340/904; 340/425.5; 340/436; 340/905; 340/937; 340/933

(58) Field of Classification Search .......... 340/425.5, 340/436, 937, 475, 933, 905; 348/148, 143
See application file for complete search history.

(56) References Cited

U.S. PATENT DOCUMENTS

| 4,260,980 | A | 4/1981 | Bates |
| 5,517,196 | A | 5/1996 | Pakett et al. |
| 6,744,353 | B2 | 6/2004 | Sjonell |
| 6,753,766 | B2 * | 6/2004 | Patchell ............ 340/436 |
| 6,927,677 | B2 | 8/2005 | Anderson et al. |
| 7,161,472 | B2 | 1/2007 | Strumolo et al. |
| 8,013,889 | B1 * | 9/2011 | Hong et al. ........ 348/148 |
| 2005/0162266 | A1 * | 7/2005 | Mills et al. ........ 340/476 |
| 2006/0284839 | A1 * | 12/2006 | Breed et al. ........ 345/156 |
| 2006/0290482 | A1 * | 12/2006 | Matsumoto et al. .... 340/436 |
| 2008/0106389 | A1 * | 5/2008 | Desai ............... 340/425.5 |
| 2008/0117031 | A1 * | 5/2008 | Chiang ............. 340/425.5 |
| 2008/0136612 | A1 * | 6/2008 | Machii et al. ....... 340/435 |
| 2010/0030430 | A1 * | 2/2010 | Hayakawa et al. ...... 701/42 |

* cited by examiner

*Primary Examiner* — Daryl Pope
(74) *Attorney, Agent, or Firm* — Crossley Patent Law; Mark A. Crossley

(57) ABSTRACT

The blind spot alert apparatus provides a pair of identical sensors for fit to opposite rear quadrants of a vehicle. Each sensor senses a presence or lack thereof of an obstacle proximal to either rear quadrant of the vehicle. Sensors signal the driver via instrument panel chime and buzzer and also via the "WARNING" and "OK" indicia in each side of the instrument panel. Signaling occurs only with a turn signal initiation. Blind spot related accidents are thereby avoided.

2 Claims, 4 Drawing Sheets

BLIND SPOT ALERT APPARATUS

BACKGROUND OF THE INVENTION

As an example of motor vehicle accident problems, according to the United States DOT, approximately 346,000 auto accidents occurred in 2006 that were directly related to merging or changing lanes. This serves as a reminder of how severe the problems of blind spots are. Blind spot typically refers to areas on both the left and right rear sides of a vehicle, usually about proximal to the rear fender or rear bumper. As an anecdote, drivers notoriously and incorrectly adjust outside mirrors to view down the sides of the vehicle, instead of off of the rear fender or bumper toward an adjacent lane, thereby negating full view of blind spots. Cautious drivers also practice a habit of glancing over their shoulder, toward a given side, to establish blind spot clearance. Such a practice is dangerous because a vehicle ahead of the driver may slow rapidly, giving the cautious driver insufficient time to react to avoid a rear end collision. Obviously the interior rearview mirror sees only behind a vehicle.

Therefore, an apparatus is needed that gives a vehicle operator a clear indication of blind spot obstruction. The present apparatus provides for alerting a vehicle operator, upon initiation of a turn signal, to any obstruction in either side's blind spot.

FIELD OF THE INVENTION

The blind spot alert apparatus relates to vehicle safety devices and more especially to a blind spot alert apparatus for a vehicle.

SUMMARY OF THE INVENTION

The general purpose of the blind spot alert apparatus, described subsequently in greater detail, is to provide a blind spot alert apparatus which has many novel features that result in an improved blind spot alert apparatus which is not anticipated, rendered obvious, suggested, or even implied by prior art, either alone or in combination thereof.

To attain this, the present vehicle blind spot alert apparatus provides a pair of sensors, each measuring about 1 inch high, 4 inches long, and 4 inches wide. Each sensor is wired into the vehicle's on-board computer (CPU) along with the turn signals, speedometer, and provided instrument panel lights. The apparatus is comprised primarily of two sensors, insulated wiring, and mounting hardware, as well as audible signals and indicator lights for the instrument panel.

The two sensors mounted at the left and right rear sides of the vehicle near the rear wheels are aimed outward into the blind spots. Each sensor preferably has a right angle mounting bracket extended from any side of the sensor, with each sensor ideally being neatly integrated into the vehicle body. The apparatus is available as a retrofit item, wherein the existing vehicle instrument panel is used, and in a more complete embodiment, including the instrument panel supplied as a part of the apparatus. The instrument panel in front of the driver has special indicator lights on the left and right sides. Each side includes a red "WARNING" light, a green "OK" light, as well as a green arrow pointed outwardly. The warning light is disposed above the green "OK" light for highest visibility for the vehicle operator. Also included for attachment within or to a vehicle is a chime and a beeper. The apparatus is linked to the vehicle's speedometer as well as the turn signal switch.

If a driver activates the left turn signal, for example, to indicate an impending lane change to the left, the circuit to the motion detection sensor on that particular side is completed. If the sensor detects the presence of another vehicle, the beeper sounds, along with the flashing red "WARNING" light on the instrument panel. Even if the lane appeared clear with a quick glance into the side mirror, this sensor apparatus would detect the problem and alert the driver to the potential hazard. The motorist could then maintain lane positioning to avoid an accident. Once the detected vehicle passed or is no longer a potential hazard, the beeping noise changes to a chime with the "OK" light activating. This signals to the driver that it is safe to change lanes with no obstructions to the side.

When the turn signal switch at the steering wheel column is manually or automatically cancelled, the device is disengaged.

The present apparatus detects vehicle velocity via the speedometer and is rendered inoperable with the vehicle stopped or below a minimum speed. Speeds settings are adjustable and include a threshold at or above 5 miles per hour. This prevents warning actuation with the fitted vehicle stopped at a traffic light alongside other vehicles, for example.

If any component of the apparatus malfunctions or fails, the driver is informed by noticing the "WARNING" or "OK" lights failure to illuminate or sound upon turn signal execution.

The present apparatus is ideally suited for use with new production motor vehicles, including automobiles, sport-utility vehicles, pickup trucks, motorcycles, vans, and station wagons. The product is also offered in an aftermarket version for retrofitting into vehicles by motorists seeking a safety upgrade.

The present apparatus prevents unnecessary accidents from occurring that result in vehicle damage, higher insurance costs, injuries, and possible deaths. The apparatus reduces some of the stress and anxiety of changing lanes and merging into busy traffic, allowing for more comfortable and pleasurable travel to be enjoyed. Keeping a driver alert and fully informed of immediate surroundings also prevents unwanted surprises, miscalculations, or other imminent hazards.

These and other objects, features and advantages are provided by the blind spot alert apparatus. The general purpose of the present blind spot alert apparatus, described subsequently in greater detail, is to provide a blind spot alert apparatus that has many novel features that result in a blind spot alert apparatus which is not anticipated, rendered obvious, suggested, or even implied by prior art, either alone or in combination thereof.

Thus has been broadly outlined the more important features of the improved blind spot alert apparatus so that the detailed description thereof that follows may be better understood and in order that the present contribution to the art may be better appreciated.

An object of the blind spot alert apparatus is to prevent accidents.

Another object of the blind spot alert apparatus is to enable a driver to determine if an obstruction exists within a vehicle blind spot area.

A further object of the blind spot alert apparatus is to enable a driver to determine if a blind spot obstruction exists without a driver head turn.

An added object of the blind spot alert apparatus is to signal a driver both visually and audibly.

These together with additional objects, features and advantages of the improved blind spot alert apparatus will be readily apparent to those of ordinary skill in the art upon reading the following detailed description of presently preferred, but nonetheless illustrative, embodiments of the improved blind spot alert apparatus when taken in conjunction with the accompanying drawings.

In this respect, before explaining the current embodiments of the improved blind spot alert apparatus in detail, it is to be understood that the blind spot alert apparatus is not limited in its application to the details of construction and arrangements of the components set forth in the following description or illustration. Those skilled in the art will appreciate that the concept of this disclosure may be readily utilized as a basis for the design of other structures, methods, and apparatus for carrying out the several purposes of the improved blind spot alert apparatus. It is therefore important that the claims be regarded as including such equivalent constructions insofar as they do not depart from the spirit and scope of the blind spot alert apparatus. It is also to be understood that the phraseology and terminology employed herein are for purposes of description and should not be regarded as limiting.

DETAILED DESCRIPTION OF THE DRAWINGS

Figure 1:
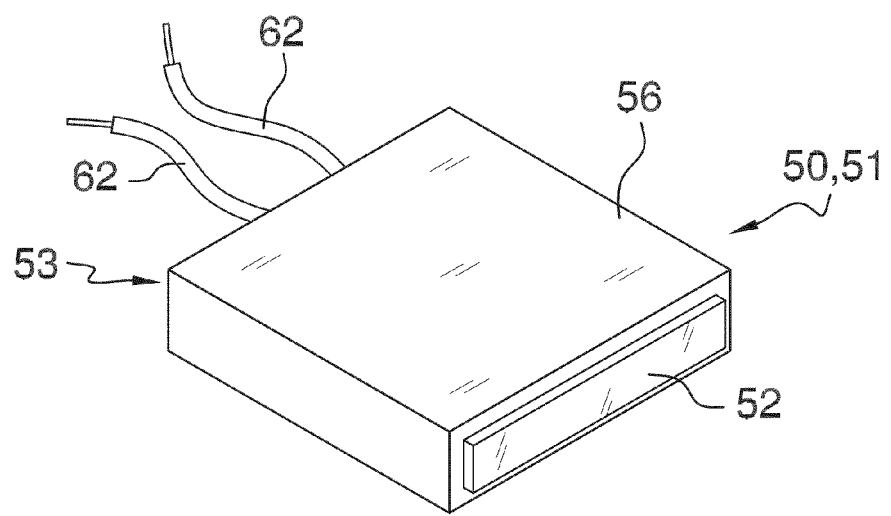
FIG. 1 is a top perspective view of a sensor.

With reference now to the drawings, and in particular FIGS. 1 through 7 thereof, the principles and concepts of the blind spot alert apparatus generally designated by the reference number 10 will be described.

Referring to FIGS. 1, 2, 3, and 4, the blind spot alert apparatus 10 partially comprises the pair of identical sensors comprising the first sensor 50 and the second sensor 51. Each sensor partially comprises a front 52 spaced apart from a back 53 and a top 56 spaced apart from a bottom 57. The first sensor 50 is mounted in the left rear quadrant area of the vehicle 12. The second sensor 51 is mounted in the right quadrant area of the vehicle 12. The front 52 of each sensor is disposed outwardly.

Figure 2:
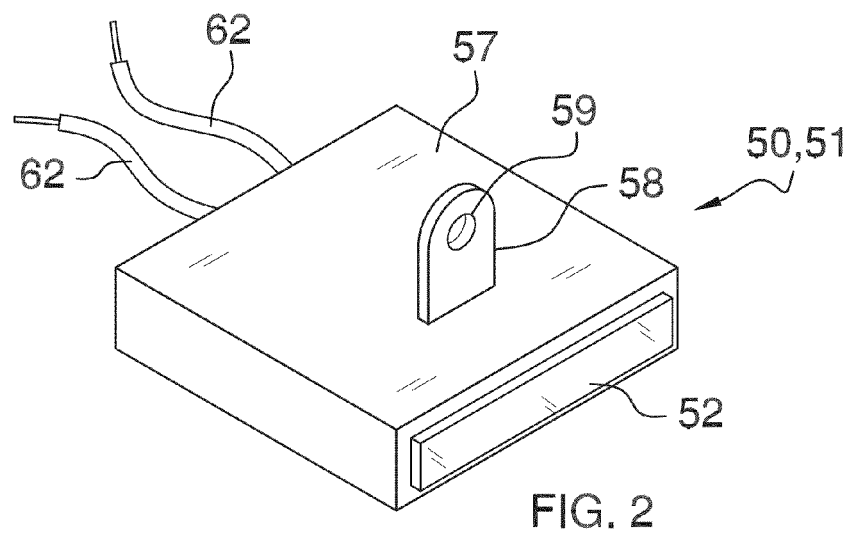
FIG. 2 is a bottom perspective view of a sensor.
Figure 4:
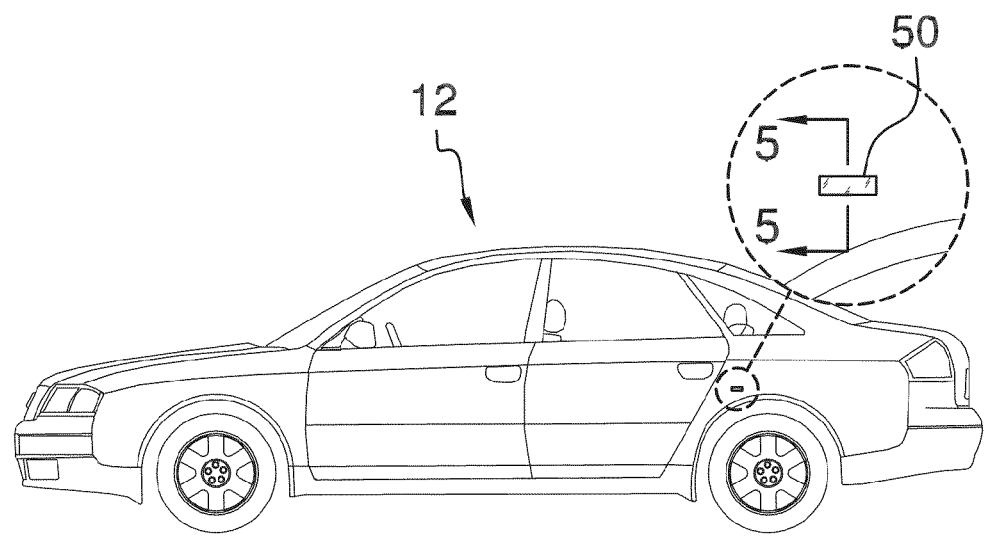
FIG. 4 is a side elevation view of one sensor installed in a vehicle.
Figure 5:
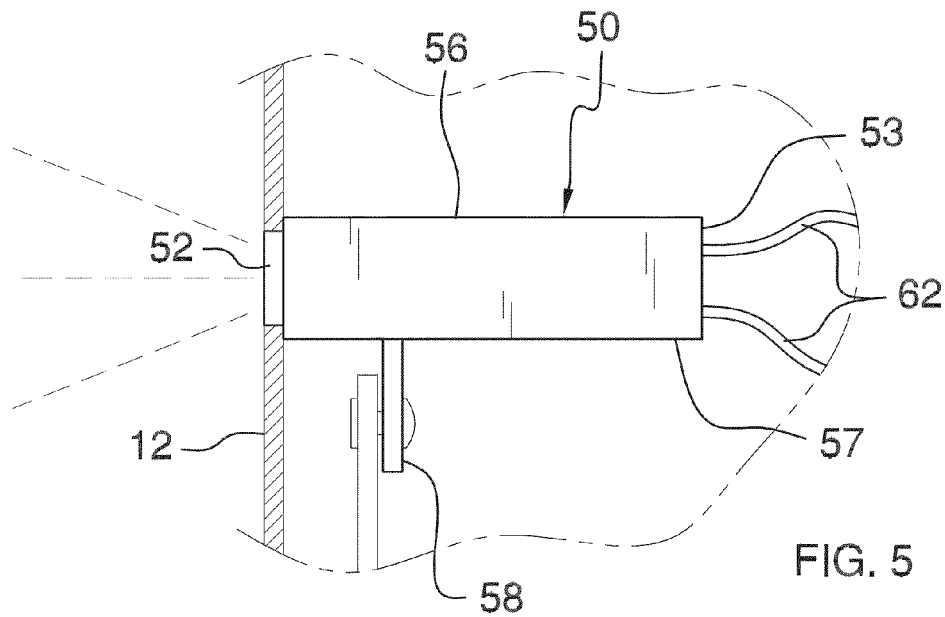
FIG. 5 is a partial cross sectional view of FIG. 4, taken along the line 5-5.

Continuing to refer to FIGS. 2, 4, and referring also to FIG. 5, the mounting bracket 58 is, in the illustrations, disposed on the top 57 of each sensor; however, the mounting bracket 58 may be disposed on any side of each sensor. The bracket orifice 59 is disposed within the mounting bracket 58. The mounting bracket 58 is further especially useful for affixing the sensors to a motorcycle, for example, wherein inner fender installation is either impossible or impractical.

Figure 7:
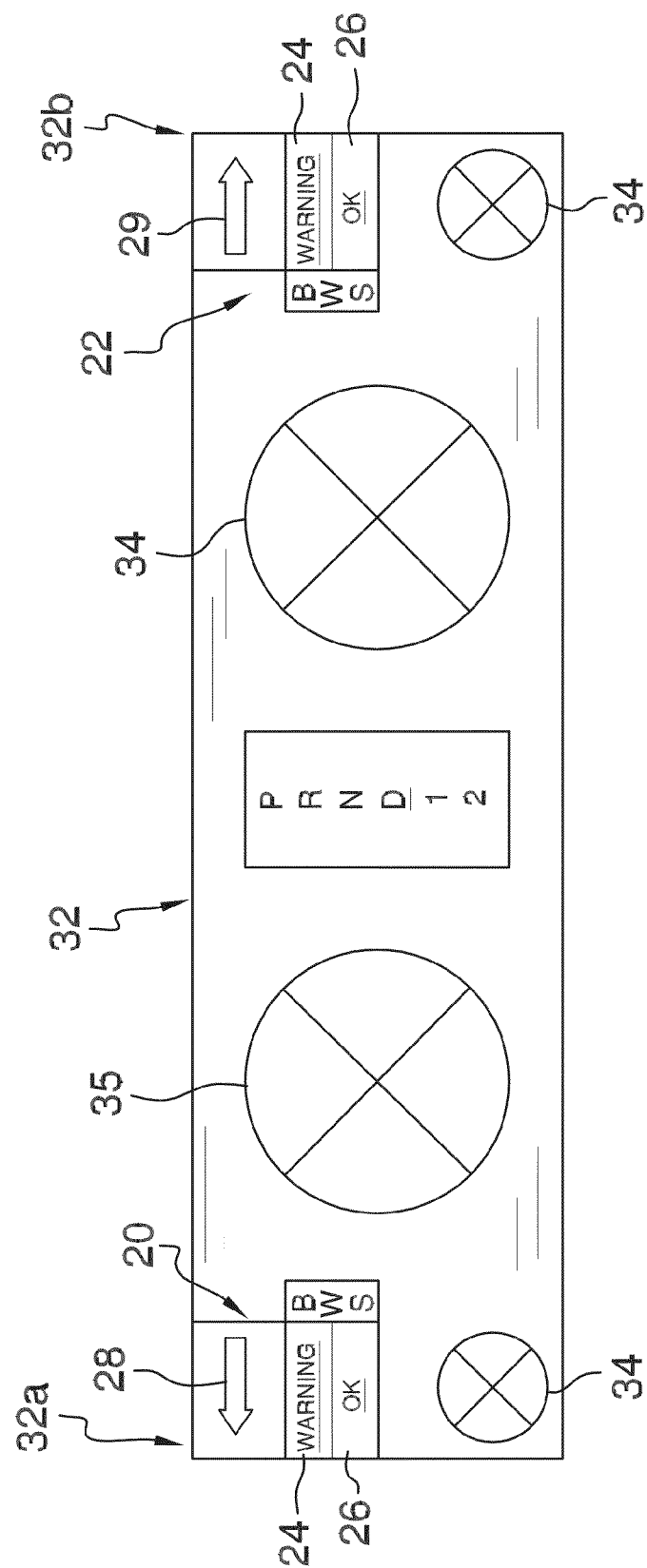
FIG. 7 is a front elevation view of the instrument panel of a vehicle, with the apparatus installed.

Referring to FIG. 7, the instrument panel 32 is installed into the vehicle 12. The instrument panel 32 consists of a plurality of gauges 34. The gauges 34 include a speedometer 35. The left display 20 is disposed within the left side 32a of the instrument panel 32. The left display 20 has a left arrow 28, a red WARNING indicia 24, and a green OK indicia 26. The right display 22 is disposed within the right side 32b of the instrument panel 32. The right display 22 has a right arrow 29, a red WARNING indicia 24, and a green OK indicia 26. The chime (not shown) is fitted within the vehicle 12. The beeper (not shown) is fitted within the vehicle 12. Applicable components of the vehicle 12 and the apparatus 10 are in communication via wiring 62.

Figure 3:
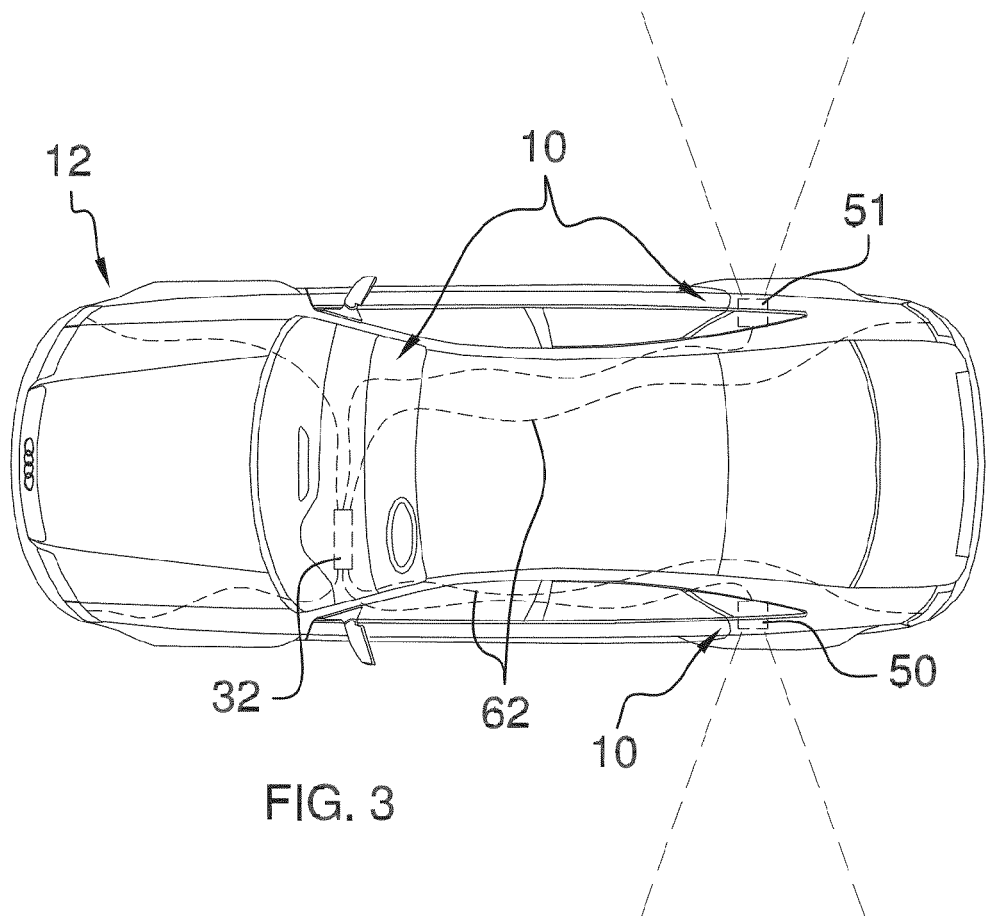
FIG. 3 is a top plan view of the apparatus installed in a vehicle.
Figure 6:
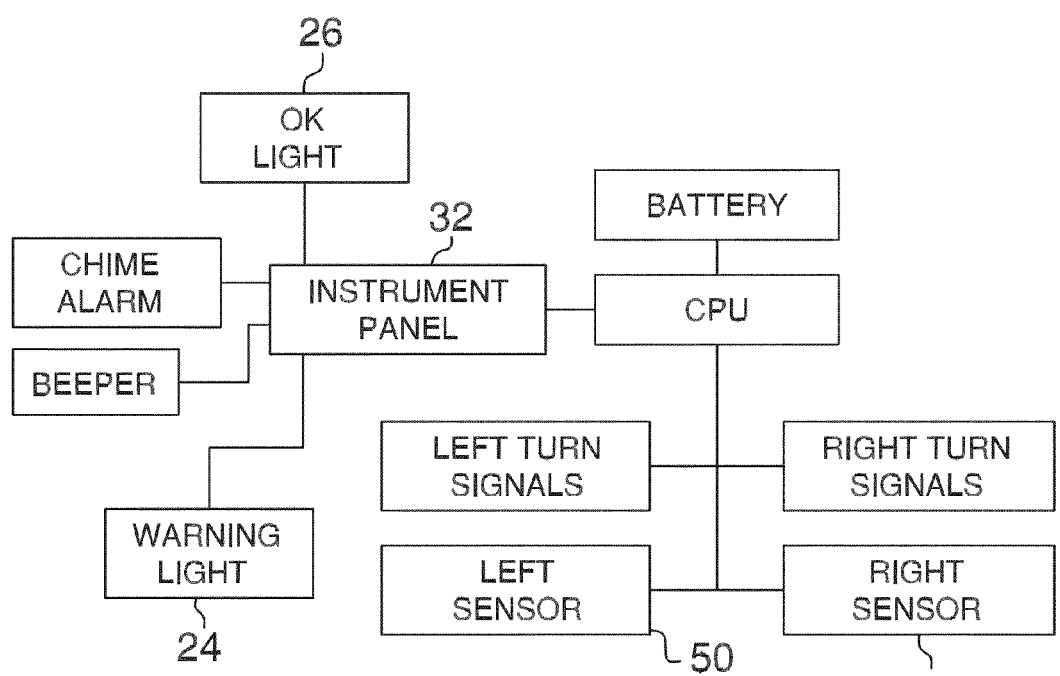
FIG. 6 is a schematic block diagram of the interaction of the apparatus with existing vehicle components.

Referring to FIG. 6 and continuing to refer to FIGS. 3 and 7, each sensor and each display is in communication via wiring 62 with an existing CPU, a turn signal switch, the speedometer 35, the chime, and the beeper. Initiation of a left turn from the turn signal switch and an absence of an obstacle proximal to the left rear quadrant area of the vehicle 12 results in lighting of the left display 20 green OK indicia 26, the left arrow 28, and a ringing of the chime. The presence of an obstacle proximal to the left rear quadrant area of the vehicle 12 results in lighting of the left display 20 WARNING indicia 24 and beeping of the beeper. The ringing and the beeping are cancelled at a speedometer 35 speed below 5 miles per hour. Initiation of a right turn from the signal switch and an absence of an obstacle proximal to the right rear quadrant area of the vehicle 12 results in lighting of the right display 22 green OK indicia 26, the right arrow 29, and ringing of the chime.

A presence of an obstacle proximal to the right rear quadrant area of the vehicle 12 results in lighting of the right display 22 red WARNING indicia 24 and beeping of the beeper. The ringing and the beeping are cancelled at a speedometer 35 speed below 5 miles per hour and at cancellation of the turn signal.

With respect to the above description then, it is to be realized that the optimum dimensional relationships for the parts of the blind spot alert apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the blind spot alert apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the blind spot alert apparatus may be used.

Therefore, the foregoing is considered as illustrative only of the principles of the blind spot alert apparatus. Further, since numerous modifications and changes will readily occur to those skilled in the art, it is not desired to limit the blind spot alert apparatus to the exact construction and operation shown and described, and accordingly, all suitable modifications and equivalents may be resorted to, falling within the scope of the blind spot alert apparatus.

What is claimed is:

1. A blind spot alert apparatus, comprising, in combination:
a pair of identical sensors comprising a first sensor and a second sensor, each sensor having a front spaced apart from a back, a top spaced apart from a bottom, the first sensor mounted in a left rear quadrant area of a vehicle, the second sensor mounted in a right rear quadrant area of the vehicle, the front of each sensor disposed outwardly;
a pair of displays fitted within an existing instrument panel of the vehicle, the displays comprising a left display in a left side of the instrument panel, a right display in a right side of the instrument panel;
a chime fitted within the vehicle;
a beeper fitted within the vehicle;

the left display consisting of a red WARNING indicia, a green OK indicia, and a left arrow;
the right display consisting of a red WARNING indicia, a green OK indicia, and a right arrow;
each sensor and each display in communication with an existing CPU, a turn signal switch, and a speedometer of the vehicle, the chime, and the beeper;
wherein an initiation of a left turn from the turn signal switch and an absence of an obstacle proximal to the left rear quadrant area of the vehicle results in a lighting of the left display green OK indicia, the left arrow, and a ringing of the chime, a presence of an obstacle proximal to the left rear quadrant area of the vehicle results in a lighting of the left display red WARNING indicia and a beeping of the beeper, the ringing and the beeping cancelled at a speedometer speed below 5 miles per hour;
wherein an initiation of a right turn from the signal switch and an absence of an obstacle proximal to the right rear quadrant area of the vehicle results in a lighting of the right display green OK indicia, the right arrow, and a ringing of the chime, a presence of an obstacle proximal to the right rear quadrant area of the vehicle results in a lighting of the right display red WARNING indicia and a beeping of the beeper, the ringing and the beeping cancelled at a speedometer speed below 5 miles per hour.

2. A blind spot alert apparatus, comprising, in combination:
a pair of identical sensors comprising a first sensor and a second sensor, each sensor having a front spaced apart from a back, a top spaced apart from a bottom, the first sensor mounted in a left rear quadrant area of a vehicle, the second sensor mounting in a right rear quadrant area of the vehicle, the front of each sensor disposed outwardly;
an instrument panel installed into the vehicle, the instrument panel consisting of:
a plurality of gauges, the gauges including a speedometer;
a left display within a left side of the instrument panel, the left display having a left arrow, a red WARNING indicia, and a green OK indicia below the red WARNING indicia;
a right display within a right side of the instrument panel, the right display having a right arrow, a red WARNING indicia, and a green OK indicia below the red WARNING indicia;
a chime fitted within the vehicle;
a beeper fitted within the vehicle;
each sensor and each display in communication with an existing CPU, an existing turn signal switch, the speedometer, the chime, and the beeper;
wherein an initiation of a left turn from the turn signal switch and an absence of an obstacle proximal to the left rear quadrant area of the vehicle results in a lighting of the left display green OK indicia, the left arrow, and a ringing of the chime, a presence of an obstacle proximal to the left rear quadrant area of the vehicle results in a lighting of the left display WARNING indicia and a beeping of the beeper, the ringing and the beeping cancelled at a speedometer speed below 5 miles per hour;
wherein an initiation of a right turn from the signal switch and an absence of an obstacle proximal to the right rear quadrant area of the vehicle results in a lighting of the right display green OK indicia, the right arrow, and a ringing of the chime, a presence of an obstacle proximal to the right rear quadrant area of the vehicle results in a lighting of the right display WARNING indicia and a beeping of the beeper, the ringing and the beeping cancelled at a speedometer speed below 5 miles per hour.

\* \* \* \* \*